United States Patent [19]
Maloney et al.

[11] Patent Number: 5,696,811
[45] Date of Patent: *Dec. 9, 1997

[54] METHOD AND SYSTEM FOR AUTOMATICALLY MONITORING THE PERFORMANCE QUALITY OF CALL CENTER SERVICE REPRESENTATIVES

[75] Inventors: Michael J. Maloney, Plano, Tex.; David T. McCalmont, San Jose, Calif.

[73] Assignee: Teknekron Infoswitch Corporation, Fort Worth, Tex.

[*] Notice: The term of this patent shall not extend beyond the expiration date of Pat. No. 5,535,256.

[21] Appl. No.: 667,861

[22] Filed: Jun. 20, 1996

Related U.S. Application Data

[63] Continuation of Ser. No. 434,261, May 3, 1995, Pat. No. 5,535,256, which is a continuation of Ser. No. 126,080, Sep. 22, 1993, abandoned.

[51] Int. Cl.$^6$ ................................................ H04M 3/22
[52] U.S. Cl. .................... 379/34; 379/85; 379/88; 379/112; 379/133; 379/265
[58] Field of Search .................... 379/34, 112, 265, 379/88, 85, 134, 135, 136, 138, 266, 308, 309, 210, 211, 157, 89, 133

[56] References Cited

U.S. PATENT DOCUMENTS

| | | | |
|---|---|---|---|
| 4,694,483 | 9/1987 | Cheung | 379/112 |
| 4,763,353 | 8/1988 | Canale et al. | 379/157 |
| 4,815,120 | 3/1989 | Kosich | 379/135 |
| 4,924,488 | 5/1990 | Kosich | 379/135 |
| 5,210,789 | 5/1993 | Jeffus et al. | 379/127 |
| 5,299,260 | 3/1994 | Shaio | 379/210 |
| 5,317,628 | 5/1994 | Misholi et al. | 379/89 |

FOREIGN PATENT DOCUMENTS 0140220  2/1987  Germany.

OTHER PUBLICATIONS

Steve McNamara, "Quality Must be Seen and Heard", *Inbound/Outbound Magazine*, Dec. 1989, pp. 66–67.

Madeline Bodin, "Keeping an Eye on Your Agents", *Call Center Magazine February 1993*, pp. 32–34.

Aspect Callcenter Product Specification, Aspect Telecommunications Corp. May 23, 1988, pp. 1–1, 8–7, 8–8, 11–5 and 13–1.

*Primary Examiner*—Krista M. Zele
*Assistant Examiner*—Scott Wolinsky
*Attorney, Agent, or Firm*—Baker & Botts, L.L.P.

[57] ABSTRACT

A method and system permit monitoring the performance of a call center agent or similar service representative in servicing calls in a call center by determining an interval within which to monitor the service representative's performance in responding to calls, as well as by determining a number of calls or length of time for monitoring the representative within the interval. The invention automatically and randomly determines the precise time within the interval for monitoring the agent for a pre-determined period of time or for a pre-determined number of calls and records the performance of the service representative at the automatically and randomly determined time with or without notification to the agent. The recorded performance may then be listened to and annotated by a call center supervisor. This provides the call center supervisor with an automated method and system for scheduling and monitoring the performance of call center agents or service representatives that is consistent and equitable among all monitored agents.

36 Claims, 10 Drawing Sheets

```
                                                              40
                                                             ↙
┌─────────────────────────────────────────────────────────────────┐
│  AGENT GROUP:_____   ←42      44                                │
│  SUPERVISOR AUTHORIZATION    ↙50              52                │
│                        48    ↙               ↙                 │
│  SUPERVISOR   46  ID#↙     PASSWORD        SUBGROUP             │
│  KATHY HELPSTER   32323239  392920393       1,2,4               │
│  MIKE TOLLER      392039    3939220         3                   │
│                         54↙        60↙         62↙             │
│  MONITORING PERIODS    ↙58       # OF       MAXIMUM             │
│           56                                                    │
│  PERIOD #↙    TIME INTERVAL     CALLS       LENGTH              │
│      1         8:00-12:00        5           20                 │
│      2         8:00-17:00        8           30                 │
│      3        12:00-17:00        4  64↙      20                 │
│                                                        72       │
│  MONTHLY MONITORING SCHEDULE FOR MONTH: JANUARY        ↙        │
│          68    70        66                                     │
│          ↙    ↙    ***** MONITORING PERIOD TO USE *****         │
│  AGENT        SG    MON   TUE   WED   THU   FRI   SAT   SUN     │
│  TOM JONES    1     1                  2                        │
│  TOM JONES    1     3                                           │
│  MARY SMITH   2           1                  1     3            │
└─────────────────────────────────────────────────────────────────┘
                          FIG. 2
                                                              80
                                                             ↙
┌─────────────────────────────────────────────────────────────────┐
│               MONTHLY AGENT MONITORED REPORT                    │
│                      JUNE 1992                   ⎫              │
│              DATE GENERATED: JUNE 30, 1992       ⎬ 82           │
│       84     PERIOD COVERED: JUNE 01 TO 30       ⎭              │
│       ↙   88  90    92           94         96       98         │
│  AGENT GROUP 01↙  ↙ ↙            ↙         ↙        ↙          │
│ 86 ↙AGENT   SG  EXT.  DAY MONITORED   TIME MONITORED  DURATION   # CALLS │
│                                                                 │
│   TOM JONES   1  123    JUNE 2          08:22          10        3   │
│                         JUNE 6          13:22          15        6   │
│                         JUNE 30         10:12          10        4   │
│                                                                 │
│   MARY SMITH  2  222    JUNE 2          10:22          16        5   │
│                         JUNE 5          15:33          12        8   │
│                         JUNE 30         09:56           5        3   │
│                                                                 │
│   SUE LISTER  3  789    JUNE 1          11:22          10        3   │
│                         JUNE 4          14:41          11        5   │
│                         JUNE 4          17:32          33       11   │
│                         JUNE 30         08:12          14        8   │
└─────────────────────────────────────────────────────────────────┘
                          FIG. 3
```

METHOD AND SYSTEM FOR AUTOMATICALLY MONITORING THE PERFORMANCE QUALITY OF CALL CENTER SERVICE REPRESENTATIVES

CROSS-REFERENCE TO RELATED APPLICATIONS

This application is a continuation of application Ser. No. 08/434,261, filed May 3, 1995 by Michael J. Maloney and David T. McCalmont entitled "Method and System for Automatically Monitoring the Performance Quality of Call Center Service Representatives," now U.S. Pat. No. 5,535, 256, issued Jul. 9, 1996, which is a continuation of application Ser. No. 08/126,080, filed Sep. 22, 1993 by Michael J. Maloney and David T. McCalmont entitled "Method and System for Automatically Monitoring the Performance Quality of Call Center Service Representatives," now abandoned.

TECHNICAL FIELD OF THE INVENTION

The present invention generally relates to telecommunications systems and methods and systems for operating telecommunications systems. More particularly, the present invention pertains to a method and system for automatically monitoring the performance of call center service representatives, including the functions of establishing monitoring schedules, recording monitoring sessions, playing back the recorded sessions, and reporting the results of the recorded sessions.

BACKGROUND OF THE INVENTION

Call centers provide a wide array of services for customers of the companies that use them. Through a call center, a company can service customers around the world, around the clock. The essence of call center effectiveness and efficiency, however, is the performance of the call center service representatives or agents that serve the calling customers. Call center supervisors manage call service representatives and are responsible for monitoring their performance. Call center supervisors monitor service representatives' telephone calls for three reasons: (1) to provide training to the customer service representatives, (2) to assure the quality of customer service, and (3) to maintain security within the company.

For a call center that uses an automatic call distributor (ACD) or PBX/ACD, there typically exist features that are integral to the ACD telephone system and that enable monitoring service representative performance. These capabilities, however, are generally manual and have significant limitations. For example, when a supervisor must schedule time periods to monitor their representatives manually the supervisor must remember when and for how long to monitor each representative. With other demands on their time and attention, supervisors may not be consistent or equitable in the ways that they monitor each agent. These inconsistencies and inequities may result in a supervisor monitoring an agent either for too little time or too much time, or too infrequently or too frequently. This an agent relative to other agents in the call center.

Another problem that manual scheduling and monitoring of agents causes is increased time pressure on the supervisors themselves. For example, they must remember who has been monitored, for how long they have monitored or intend to monitor an agent, and when to monitor the agent. If a call center has numerous service representatives, the requirement to monitor the performance of these agents may seriously and adversely affect the productivity of the call center supervisor. This is because the task of monitoring agents is only one of many tasks that the supervisor must perform.

Consequently, there is a need for a method and system that ensures consistency and equity across all agents and that provides a fair system for evaluating each agent's performance in servicing customer calls.

There is a need for a method and system that assists in reducing management pressure on call center supervisors and that permits them to increase their productivity by not always being concerned about the period of monitoring, the frequency of monitoring, or the time of monitoring as they perform their other managerial functions.

There is a further need for a method and system that permits call center supervisors to more effectively control the time at which they monitor the performance of the agents they supervise.

SUMMARY OF THE INVENTION

The present invention, accordingly, provides a method and a system for scheduling and monitoring agents in a call center that overcome or reduce disadvantages and limitations associated with prior agent monitoring methods and systems.

One aspect of the invention is a method for monitoring the performance of agents or service representatives in servicing calls that a call center receives. The method includes the steps of automatically determining an interval within which to monitor the performance of the service representative who responds to received calls. The method further includes the steps of automatically determining the number of calls for monitoring within the interval and automatically and randomly determining the precise time for monitoring the number of calls within the interval. The calls are monitored automatically at the randomly determined times and recorded so that the call center supervisor may later listen to the monitored sessions at the supervisor's convenience. Additionally, the method includes forming automatic schedules for each monitoring session to be recorded and producing monitor reports for each of the monitoring sessions that are recorded.

A technical advantage of the present invention is that it eliminates the need for a supervisor to remember when, who, how often, and for how long to monitor an agent once the supervisor has employed the method and system for this purpose. This frees the supervisor from the task of keeping track of when to monitor the agents. It reduces the pressure on supervisors, while at the same time increases their productivity. The method and system of the present invention also ensure consistency and equity among all agents. Furthermore, the present invention institutes, through its random selection of the times within the specified interval to monitor the agents, a fair process for evaluating agent performance. Another technical advantage of the present invention is that it records each of the monitored sessions for later playback by the call center supervisor. If the call center supervisor desires, the agent may be notified of the upcoming monitored session. This may be important, because currently federal legislation is pending that would require the call center supervisor to notify a call center agent of the fact that the call center supervisor will be monitoring him or her.

Another technical advantage of the present invention is that by recording the monitoring sessions, the call center supervisor may review the session at his or her convenience. In one embodiment of the invention, recorded messages are stored on disk, rather than on tape. This permits recorded comments to be inserted easily into the recorded session by other call center supervisors for future reference as well as for later review by the monitored call center agent. Storing the monitoring sessions on disk permits the supervisor to also selectively delete monitoring sessions.

Yet another technical advantage of the present invention is that it automatically provides reports of the monitoring activity within the call center. This provides proof of and accountability for each of the monitored sessions. The reports of actual monitored times for each call center agent are documents that provide consistency and equitability to a degree that no known system provides. Therefore, the method and system of the present invention result in a voice processing application that easily and reliably automates the process of scheduling monitoring sessions for call center service representatives.

BRIEF DESCRIPTION OF THE DRAWINGS

The functions and modes of use and advantages of the present invention are best understood by reference to the following description of illustrative embodiments when read in conjunction with the accompanying drawings, wherein:

FIG. 2 illustrates a possible example screen for programming pre-determined intervals, the number of calls in each interval, maximum length of monitoring session, and other aspects in determining parameters associated with the preferred embodiment;

FIG. 3 shows a report screen that shows the results of the monitoring sessions established by the preferred embodiment;

DETAILED DESCRIPTION OF THE INVENTION

The preferred embodiment of the invention is best understood by referring to the FIGUREs, wherein like numerals are used for like and corresponding parts of the various drawings.

Figure 1:
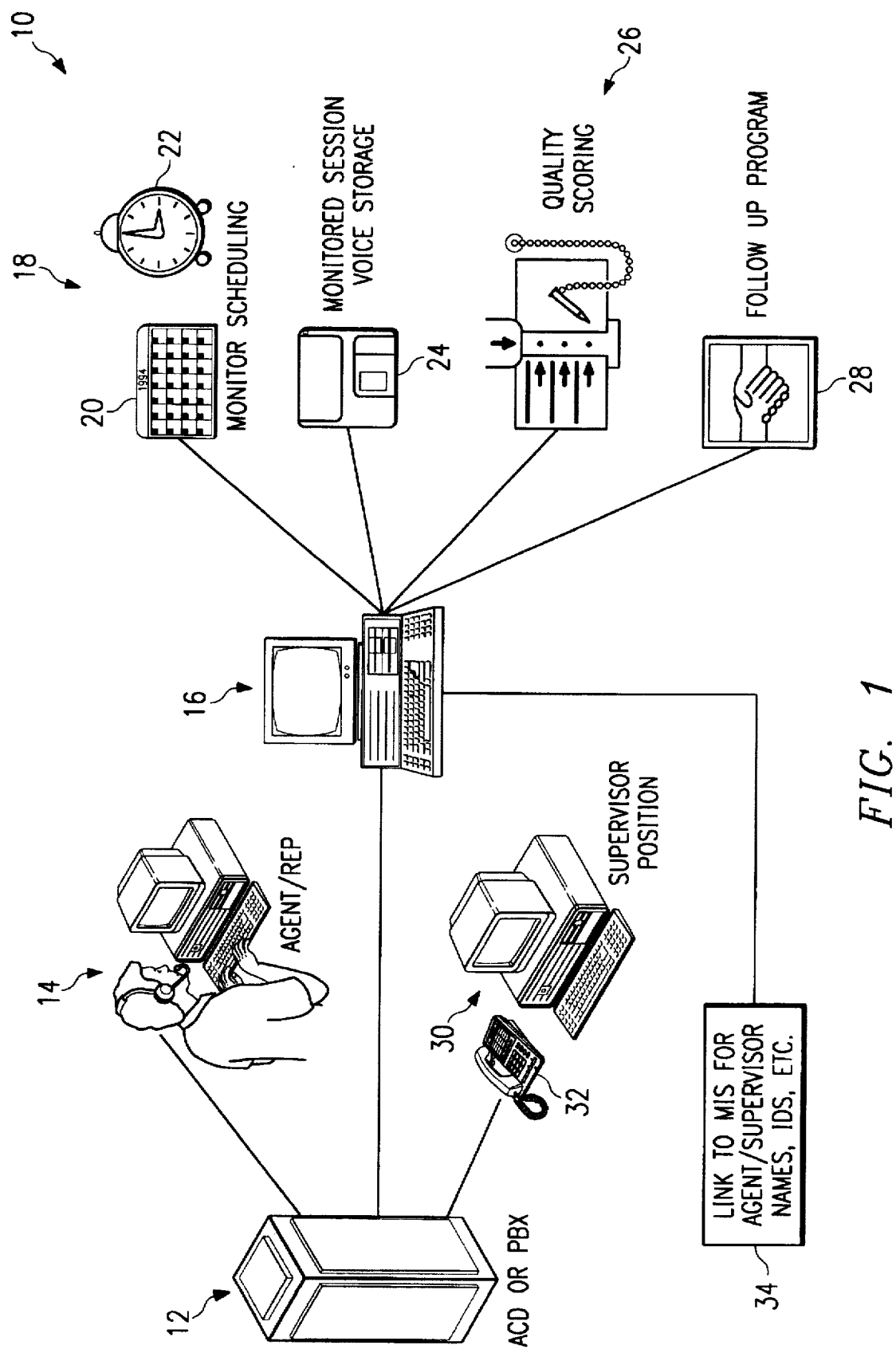
FIG. 1 provides a schematic block diagram of the system of the preferred embodiment as it may be used within a call center.

FIG. 1 shows an environment 10 that is a portion of a call center for practicing the preferred embodiment of the invention. In the call center environment 10, calls may originate through a switching device such as an ACD or PBX 12 for delivery to an agent or call service representative 14. Computerized platform 16 connects to ACD 12 and includes the necessary controls and software instructions for performing the steps of the preferred embodiment. For illustrative purposes, a set of icons in FIG. 1 describe the functions that the preferred embodiment performs. For example, icon set 18 includes calendar icon 20 and clock icon 22 to represent the monitor scheduling that the preferred embodiment performs. Diskette icon 24 represents the monitored session voice storage of the preferred embodiment. Notebook icon 26 represents the quality scoring that the invention makes possible. Based on the information that the preferred embodiment makes available both consistently and equitably, icon 28 represents the result of a supervisor being able to follow up with the call center agent and improve the agent's overall performance quality.

Within environment 10, supervisor workstation 30 represents the ability that the invention gives to the supervisor of programming the automatic scheduling and monitoring system functions. ICON 32 represents the supervisor telephone connected to the ACD or PBX 12 that is used to listen to the recorded monitored sessions. Block 34 represents the link between computer-based system 16 and the call center's Management Information System or MIS Most of ACD or PBX 12 for obtaining agent and supervisor names, identification numbers and data and other information relating to the environment of the call center.

The automatic scheduling and monitoring system of the preferred embodiment is a voice processing application that frees the supervisor from the worrisome and time-consuming task of keeping track of when agents need to be monitored and records the monitoring session as scheduled. The preferred embodiment, therefore, permits a supervisor to establish the monitoring schedule, load the schedule into computer-based system 16, and then listen to the recorded sessions at the supervisor's convenience using a supervisor instrument 32 (or remote telephone—such as the phone in their home/not shown) that may include a speakerphone.

In FIG. 2, monitor schedule screen 40 shows the data input that a call center supervisor would provide for automatically scheduling and monitoring the performance of call center agents. In particular, position 42 permits the system administrator to input the agent group number where monitoring is to occur, and position 44 permits the system administrator to enter authorized supervisor names at position 46, supervisor identification numbers at position 48, supervisor passwords at position 50, and subgroups at position 52 for the various supervisors that have authorization to monitor within the group. Monitoring Periods block 54 permits the system administrator to identify the periods for monitoring at position 56, the time interval for monitoring at position 58, the number of calls to monitor in the period at position 60, and the maximum length of the monitoring period at position 62.

Position 64 permits the call center supervisor to specify the month for which the monthly monitoring schedule is being established. In space 66 appears a weekly or monthly calendar to establish the monitoring periods for the individual call center agents. For example, at position 68 the supervisor can input the name of the call center agent that the supervisor desires to be monitored. At position 70, the supervisor may designate the subgroup to which the agent belongs. In position 72, the supervisor may identify, for each the day of the week within the month, and the period during which the agent is to be monitored. The system, therefore, permits the call center supervisor or other authorized operator to assign the monitoring periods and associate them with a time range and duration for the monitoring session.

When the time period ends during a monitoring session and the agent is in the middle of a call, the preferred embodiment continues to monitor the call until the agent completes the call. The monitoring schedule may consist of up to 24 months, as established for each agent by the call center supervisor. This may be done by assigning one of the monitoring periods to any number of days within each month.

In FIG. 2, the name "TOM JONES" appears twice. This is to illustrate that a call center supervisor may direct the system of the preferred embodiment to monitor the agent multiple times within a single day. The supervisors whose names appear in position 46 of monitoring schedule screen 40 are the only persons authorized to play back or listen to the monitored sessions for the call center agents in the subgroups designated at respective positions 52.

The automatic scheduling and monitoring system of the preferred embodiment randomly schedules the monitoring session of an agent during the specified monitoring period. For example, if an agent is scheduled to be monitored between 8:00 a.m. and 11:00 a.m., the automatic scheduling and monitoring system will randomly select a time slot within the specified three-hour window to perform the monitoring. Agents are then monitored for the numbers of calls or maximum duration of the assigned monitoring period that position 54 specifies.

FIG. 3 shows an exemplary monthly agent monitored report screen 80 that the preferred embodiment may use. For example, header 82 specifies the title of the screen as being the "MONTHLY AGENT MONITORED REPORT" for June 1992. Header 82 further specifies the date that report screen 80 is being generated as well as the period that the report covers. Screen 80 further indicates at position 84 the agent group pertaining to the report. At column 86 appears the name of each agent that the report includes. Column 88 provides the subgroup to which the agent belongs and column 90 specifies the agent's extension. Column 92 identifies the days on which the agent was monitored. Column 94 identifies the time that the agent was monitored. Column 96 specifies the duration of the monitoring session, and column 98 specifies the number of calls that the method of the preferred embodiment monitored.

The preferred embodiment also has the ability to produce a daily agent monitor report that lists the agents that the system monitored. Thus, the system displays, by group, the time of day that monitoring occurred together with the computer file name associated with the monitored session. The supervisor may print this report as well as write it to disk at the end of the day. The monthly agent monitor report uses the daily agent monitor report to provide its list of monitored agents.

Monitoring sessions may be either "silent" or may include a beep tone that the agent hears. Therefore, depending on how the call center supervisor desires to or must operate (i.e., as matter of complying with certain laws that govern monitoring), the call center agent can either be aware or unaware that the call is being recorded. Additionally, the preferred embodiment may be configured to send a verbal message to notify the agent that monitoring will be taking place. These messages may be provided at the beginning of their scheduled monitoring period or just prior to the first call to be monitored.

If an agent is not signed on when the system tries to monitor him or her, the system will attempt to monitor the agent at successive fifteen-minute intervals following the initial attempt until the end of the specified monitoring period. The monitoring sessions that are missed due to an agent not being signed on during the monitoring period will be noted on the agent monitored report.

An important aspect of the preferred embodiment is the ability for supervisors to "log on" to the system with the identification number and password specified in monitor scheduling screen 40 for the appropriate agent group. The supervisor may log on by entering digits from, for example, a numeric keypad such as that associated with the instrument 32 at supervisor workstation 30 of FIG. 1. In providing a way for playing back the results of the monitored session, the preferred embodiment verifies the supervisor access and permits the supervisor to listen to all sessions or to specify a particular session for playback. In doing this, the call center supervisor may specify the recorded session that he/she desires to play beck. The method and system of the preferred embodiment will then retrieve the recorded session. Each recorded session has an associated time stamp that describes when the recording started and the number of minutes of monitoring that were actually recorded.

Normally recorded session playback is at the same speed as the actual conversation. Supervisors may, however, elect to speed up the playback by depressing a dial pad key. The preferred embodiment permits increasing the playback speed in increments up to approximately a double speed (e.g., a 10-minute segment of recorded speech may be played back to the listener in a compressed period of five minutes). Accelerated playback may be slowed down in increments to a normal speed by pressing another dial pad key. Additionally, call center supervisors may elect to "jump back" or "skip ahead" in 10-second increments or skip over the call completely.

Once a call center supervisor listens to a recorded monitoring session, the supervisor may elect to save or erase the recording. Supervisors may also voice annotate each monitored call by recording any number of messages that become inserted into the monitored call. These annotations may then be used when passing the recorded call to another supervisor or for commentary when the supervisor plays back the call during a coaching session with the call center agent. The supervisor may annotate each monitored call once or several times.

Monitored sessions of the preferred embodiment are digitized and compressed at between 9,600 to 32,000 bits per second (bps) and then stored on disk. However, the digitization rate of 24,000 bps offers satisfactory fidelity recording and minimizes the amount of disk required to store the monitored session. The preferred embodiment will verify that sufficient disk space remains prior to beginning a monitoring session. If there is insufficient disk space to complete the scheduled session, the preferred embodiment displays an "OUT OF DISK SPACE" message on system monitoring report 80, and produces an error output for an associated error log at a system printer. The call center system administrator may then delete old recorded sessions to free necessary disk space. Monitoring sessions missed because of insufficient disk space, in the preferred embodiment, will not be retroactively invoked once disk space is made available.

The preferred embodiment utilizes a number of configured voice channels or ports to perform the monitored session. Multiple voice channels may be configured for monitoring and playback of the monitored sessions to the call center supervisor. Individual voice channels may be configured for monitoring only, playback only, or for both monitoring and playback. When all channels used with the preferred embodiment are configured for both monitoring and playback, call center supervisors who desire to listen to monitored sessions may need to "camp on" for an available channel. However, once a channel completes a monitoring session, it will wait momentarily before establishing the next monitoring session so that camped-on supervisors may access the system.

Having described the general system overview and interface communication between the preferred embodiment and user, the following description outlines in more detail the system architecture, operation flow, software control flow, software module descriptions, inter-process communications, database and data structure definitions as well as implementation requirements for the preferred embodiment.

For implementing the present invention, certain system hardware and system software requirements should be met. These hardware requirements are included in FIG. 4 as system architecture 100. System architecture 100 includes main machine 102 which preferably is a 486/50 MHz personal computer with 16 MB of memory. Main machine 102 includes hard disk 104 and operates under a DOS 5.0 or higher environment using a graphical user interface system such as the Windows® Graphical User Interface (version 3.1 or higher) as indicated by block 106. AVIS D/41D® dynamic link library (DLL) and Dialogic® combination driver 108 are supported by DOS system 106 and that drive Dialogic® D/41D® cards 110, for instance. Other systems such as those manufactured by Retorix®, Natural Micro Systems®, or proprietary systems may provide the functions of Dialogic® combination 108 and 110 depending on their availability and other system considerations.

The application program of the preferred embodiment is represented by block 112 in system architecture 100. Remote access is permitted by block 114, which uses the ReachOut® remote access software, for instance, that DOS and Windows® environment 106 supports for remote access via serial port link 116. Hard disk 104 may be controlled using a database management package such as the Access® package that block 118 indicates. Furthermore, hard disk 104 may use a backup tape such as 8 mm. tape 120. Serial port link 116 connects to modem 122 and MIS host 124 that resides within ACD 12. System architecture 100 may also include parallel port link 126 that connects to printer 128. Voice processing cards such as Dialogic® D/41D® 110 connect to VRU ports 130 of ACD 12. ACD 12 provides voice communication paths to the call center supervisor as indicated by triangle 132 as well as to the call service representatives or agents as indicated by triangles 134 and 136.

To view the operations of system 100, a color VGA monitor with a 256K RAM VGA card is preferred. A bus mouse, two serial ports and parallel port should be used. Hard disk 104 includes an SCSI bus hard disk drive. Within main machine 102, a 64 KB cache and a 1.44 MB 3.5" floppy drive is recommended. Modem 122 should be a 9600 baud or higher device.

Figure 5:
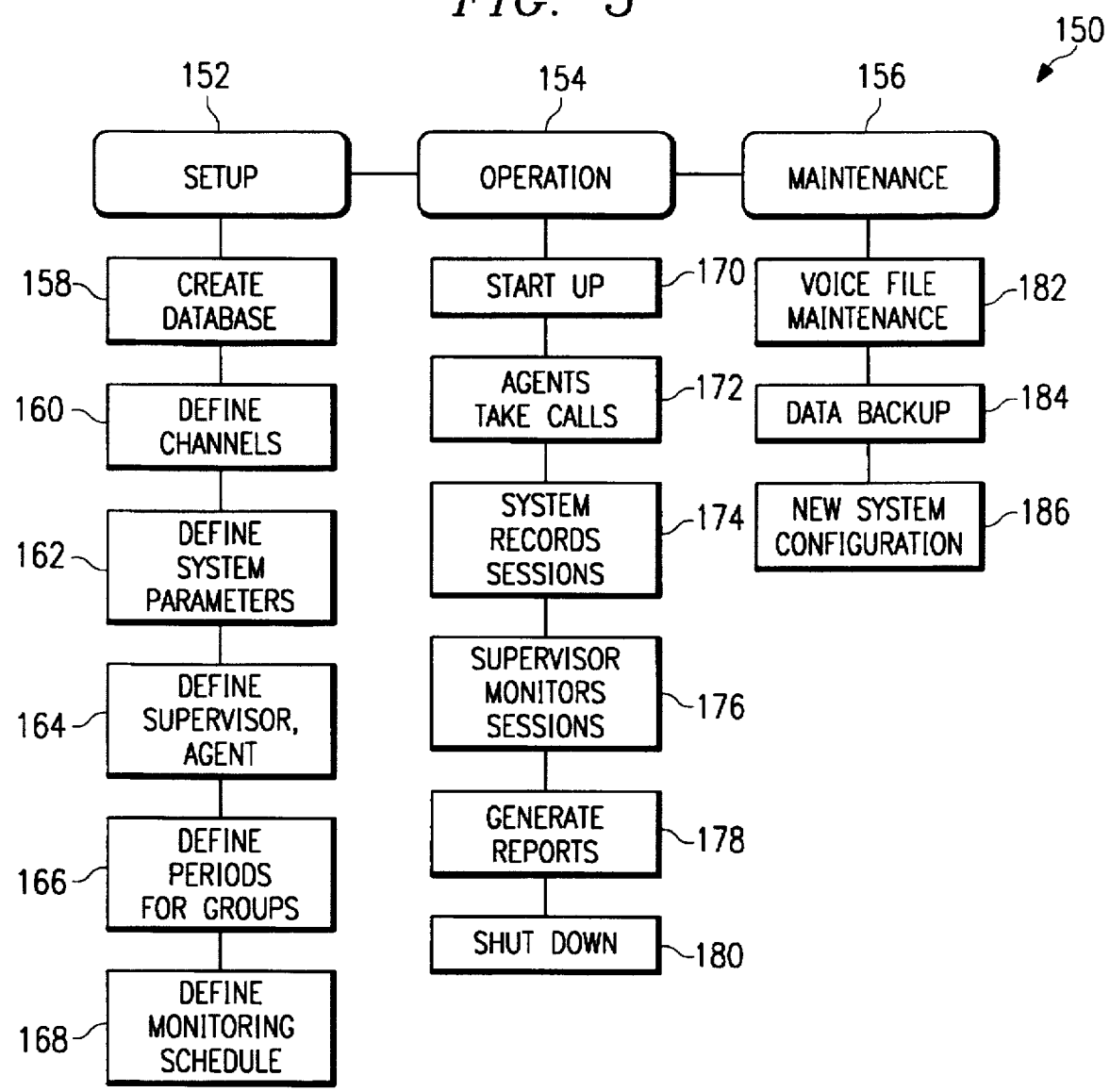
FIG. 5 shows an application block diagram for the preferred embodiment of the present invention.

FIG. 5 shows the application block diagram 150 for the preferred embodiment of the present invention. The system of the present invention includes three basic modes of operation including set-up mode 152, operation mode 154, and maintenance mode 156. Set-up mode 152 includes the functions of creating the database as block 158 indicates, defining channels or ports within the system as block 160 indicates, defining system parameters as block 162 indicates, and defining the supervisors and agents as block 164 indicates. Set-up mode 152 also includes the functions of defining periods for groups as block 166 indicates and defining monitoring schedules as block 168 indicates.

Operation mode 154 includes the functions of system start-up as block 170 represents, listening for agents to take calls as block 172 indicates, recording sessions as block 174 indicates, monitoring or playing back sessions as block 176 indicates, generating reports as block 178 illustrates, and shutting down as block 180 illustrates.

Maintenance mode 156 includes the functions of voice file maintenance represented by block 182, data back-up as block 184 illustrates, and new system configuration per block 186.

Figure 6:
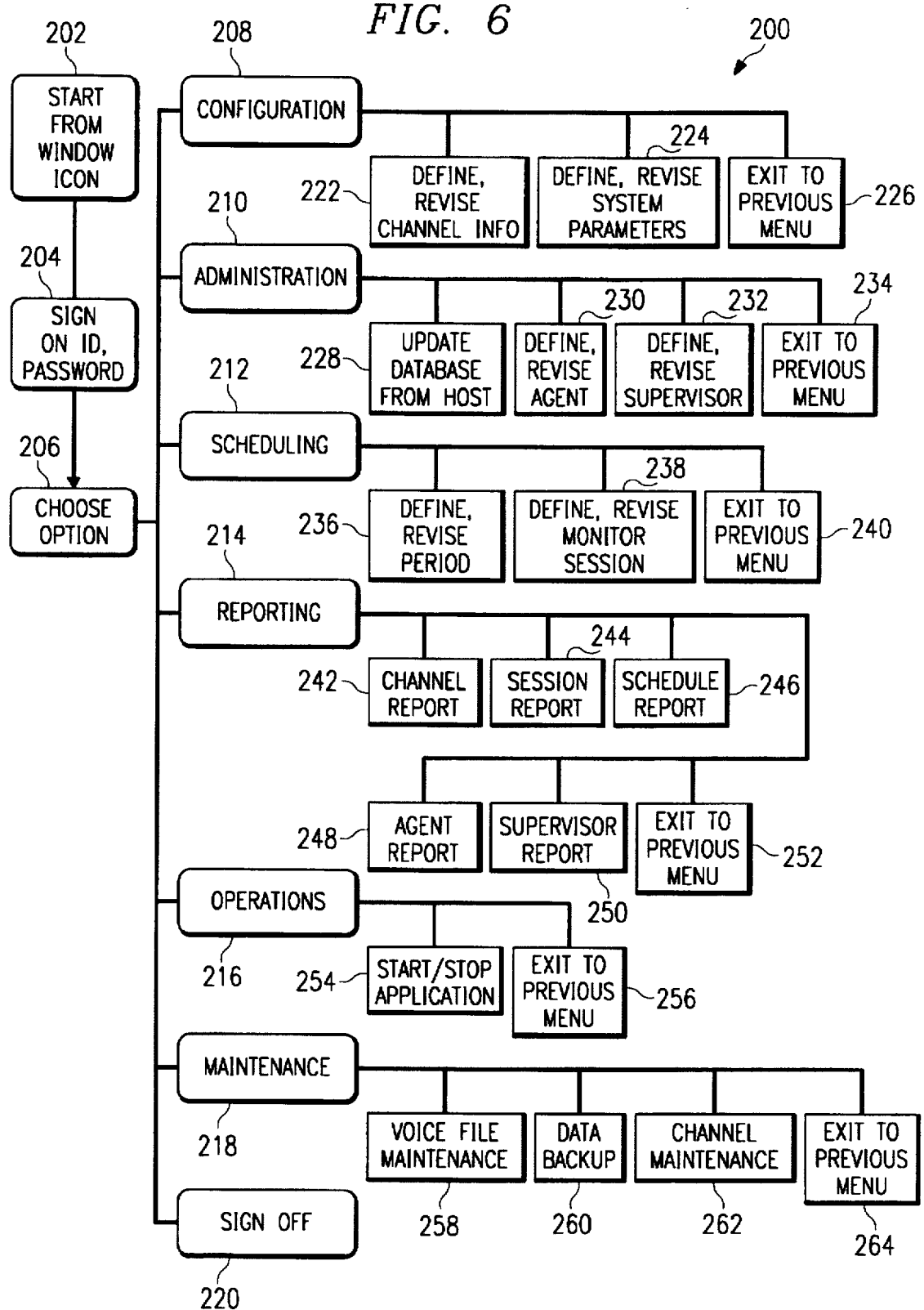
FIG. 6 is hierarchical interface block diagram for the preferred embodiment.

The following discussion illustrates how the preferred embodiment performs the above-listed functions in their respective modes of operation. Referring to FIG. 6, there is shown interface block diagram 200 as a hierarchical illustration of the user interfaces that the preferred embodiment provides. Beginning at icon access block 202, a user may access the functions of the preferred embodiment through an icon in the Windows® environment. Following use of the Windows® icon, the next step is to sign on to the system using a password or similar access mechanism as password block 204 indicates. Next, the user has the ability to chose an option to operate various aspects of the system. Choice block 206 illustrates the function of permitting the user to choose among the various options. The various options include configuration option 208, administration option 210, scheduling option 212, reporting option 214, operations option 216, maintenance option 218, and sign-off option 220.

Configuration option 208 includes the functions of defining and revising channel information as block 222 illustrates, defining and revising system parameters as block 224 represents, and exiting to the previous menu as block 226 illustrates. Administration option 210 includes the functions of updating the database from the host as block 228 indicates, defining and revising the agent as block 230 represents, defining and revising the supervisor as block 232 indicates, and exiting to the previous menu as block 234 shows. Scheduling option 212 includes the functions of defining and revising the period of monitoring as block 236 indicates, defining and revising the monitor session as block 238 represents, and exiting to the previous menu as block 240 shows.

Reporting option 214 includes a variety of functions that provide reports to the user. These include a channel report, a session report, a schedule report, an agent report, and a supervisor report as respective blocks 242, 244, 246, 248, and 250 illustrate. Reporting option 214 also permits the user to exit to the previous menu per block 252. Operations option 216 includes the start/stop function for the system as block 254 represents and exiting to the previous menu as block 256 indicates. Maintenance option 218 includes the functions of maintaining the voice file as function block 258 represents, data back-up as block 260 represents, channel maintenance as block 262 indicates, and exiting to the previous menu as block 264 shows.

An important aspect of the functions of the preferred embodiment is the various reports that the supervisor may receive. These give to the supervisor easy-to-understand information that no prior system provides. For example, in report option 214, reports may be generated to the supervisor screen display as well to a printer for a paper copy. The reports from reporting option 214 are described as follows:

The channel report associated with block 242 contains information pertaining to voice processing channels. This report includes the computer port that the preferred embodiment is using, the device name, if any, the type, the usage of either recording or playback, the latest state, and possible trouble counts.

The session report of block 244 is by group, subgroup, and extension. This report contains all recorded session logs. It can be requested for those not-yet-played (i.e., listened to) sessions and their associated file length (in minutes and seconds) or for those existing voice files regardless of whether they have been played or not with the play indication in addition to file length. Alternatively, all sessions that have been recorded, including those deleted, can be reported in the session report. Furthermore, the session report of block 244 may include the supervisor's identity who deleted the session, the date that the voice file was deleted and the file name and length of still accessible sessions.

The schedule report of block 246 illustrates monitoring sessions scheduled by group, subgroup, and extension. It is available monthly, weekly or daily and lists all extensions and monitoring periods associated with each extension.

The agent report of block 248 contains agent information such as group number, subgroup number, identifier, name, and extension. The agent report may be for all groups or a particular group.

The supervisor report of block 250 contains supervisor information such as the supervisor's group number, authorized subgroups, identifier, and name. For the supervisor report, the password will be encrypted on the screen display.

Figure 7:
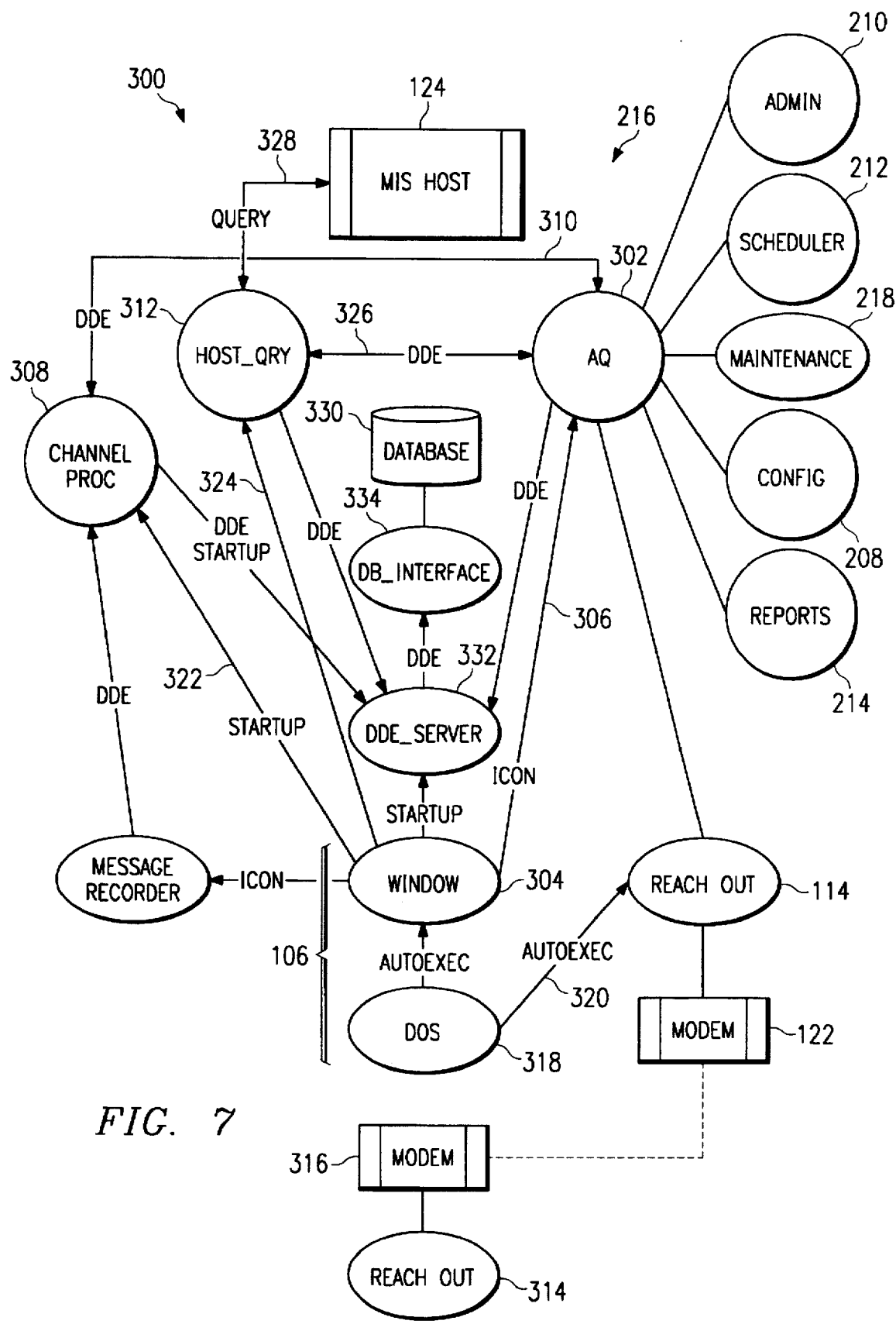
FIG. 7 provides a process control flow diagram for the preferred embodiment.

Having described the user interfaces and options of the preferred embodiment, a next step in understanding the present invention is to examine the process control flow of the various options of FIG. 6. For this purpose, FIG. 7 shows process control flow diagram 300. In process control flow diagram 300, aq program 302 represents an important part of the system of the preferred embodiment. Through aq program 302, process control flow to the options and functions of the preferred embodiment is possible. For example, aq program 302 permits the user to choose among the options listed in user interface block diagram 200 of FIG. 6. That is, through aq program 302, a user has the ability to direct process control to administration option 210, scheduling option 212, maintenance option 218, configuration option 208, and reporting option 214. Additionally, through aq program 302, the user has the ability to use the operations option of the preferred embodiment as indicated generally by arrow 216.

Figure 4:
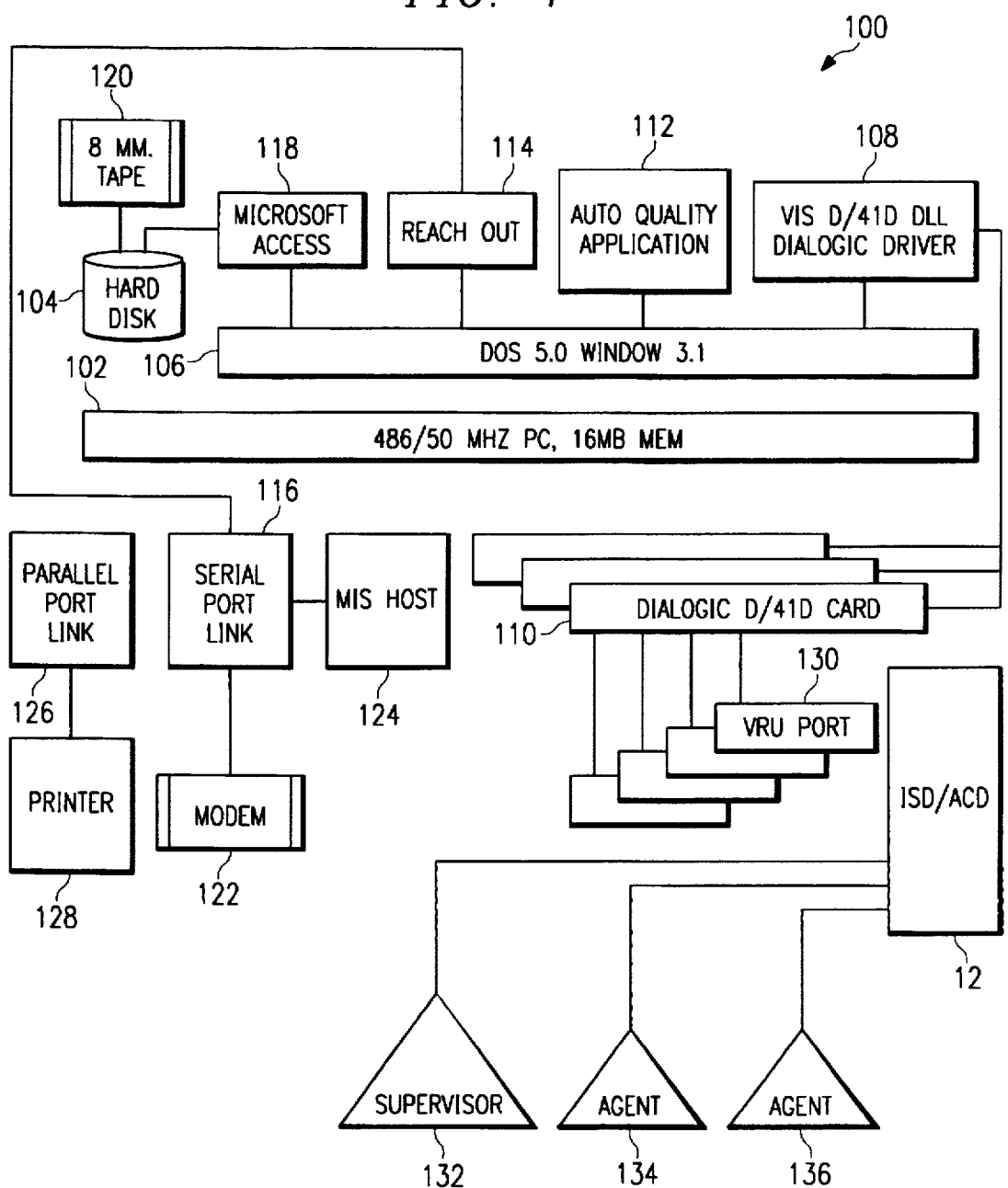
FIG. 4 provides a conceptual block diagram of a hardware and software configuration for carrying out the inventive concepts of the preferred embodiment.

The following discussion further details process control flow within the operations option 216 of the preferred embodiment. The preferred embodiment uses Windows® graphical user interface 304 to access aq program 302 through an icon as icon arrow 306 represents. All of the monitoring and playback sessions are done by a channel processing program herein called channel_proc program 308. The channel_proc program 308 is a memory resident program that communicates with aq program 302 using the dynamic data exchange (DDE) link or mechanism 310 from the Windows® graphical user interface. Another memory resident program, host_qry program 312 handles database queries to the ACD MIS host 124 through one of the serial communication ports such as serial port link 116 of FIG. 4. Remote access is facilitated by ReachOut® program 114 which is also a memory resident "terminate and stay resident" (TSR) program. System architecture 100 of FIG. 4 is the host of ReachOut® program 114 through modem 24, while a remote site machine also runs its own ReachOut® program as indicated by block 314 to remote site modem 316. Therefore, remote access requires that the remote site be a PC-based machine with Windows®.

ReachOut® program 114 is resident within system architecture 100 and is started by the "autoexec.bet" program of DOS system 318 as indicated by arrow 320, when main machine 102 is booted. ReachOut® program 114 will wait on modem port 122 for any remote access. The channel_proc program 308 and host_qry 312 are started when Windows® interface 304 is up and are terminated when Windows® interface 304 is not running as arrows 322 and 324 represent. The host_qry program 312 synchronizes the system clock with the MIS host 124 when started. It then waits for the DDE message 326 from aq program 302 for any database query task 328. The channel_proc 308 checks all Dialogic® channels when started. It then waits for the start-up DDE message 310 from aq program 302.

Once the application is initially started, the channel_proc program 308 accesses the resident Access® database to establish monitoring sessions that may be scheduled for the day. A random calculation algorithm establishes the recording of extensions scheduled to be monitored. The channel_proc program 308 also handles the supervisor's requests for playback session. Upon receiving a shutdown DDE message from aq program 302, the channel_proc program 308 will terminate all call processing activities on the voice processing channels. The channel_proc program 308 also performs channel diagnosis per request from aq program 302 and updates the status to the aq screen through DDE message 310.

System data is centralized in resident Access® database 330 where the aq program 302 would retrieve and update information pertaining to extensions, supervisors, monitoring periods and monitoring sessions. The host_qry program 312 updates the database if the group, supervisor, or extension definitions have been updated or modified at the MIS host 124 side after query 328.

In order to process centralized database 330 accessing, there should be one Windows interface responsible for handling DDE messages and another Windows interface responsible for managing database 330. This guarantees the data integrity as well as reduces the message resource requirements. All database 330 transaction-related DDE messages are handled through a single point of control. In the preferred embodiment, the single point of control is dde_server program 332. All actual database transactions are handled by db_interface program 334. Both dde_server program 332 and db_interface program 334 are memory resident when Windows interface 304 is operating.

When the channel_proc program 308 responds to a request of channel status through the aq program 302, the response will be one message per channel in order to simplify the message handling as well as to support the request of a single channel diagnosis.

The following discussion describes in more detail the application software modules of the preferred embodiment. The preferred embodiment, however, uses multi-tasking capabilities of the Windows graphical user interface 304 to fulfill the requirements of being able to perform call processing tasks, user interface functions, and remote control operations concurrently. For example, the discussion that follows provides more detail concerning one embodiment of the aq program 302.

The aq program 302 provides all interfaces to configuration option 208, administration option 210, scheduling option 212, reporting option 214, operations option 216, and maintenance option 218 in a Windows® interface 304 menu-driven fashion. The aq program 302 communicates with the db_interface program 334 using the DDE mechanism whenever there is a need to access database 330. In the preferred embodiment, the aq program 302 will be a client to db_interface program 334 and related through the DDE link.

The host_qry program 312 is a memory resident program started from Windows® interface 304. The host_qry program 312 uses one of the serial ports on main machine 102 as the communications link with MIS host 124. This design makes the host database query 312 not so tightly coupled with main machine 102. Therefore, there is flexibility for switches manufactured by different vendors. MIS host 124 side, therefore, only has to provide a way to access the database that this application needs.

It is important to synchronize the system clocks whenever there is more than one computer involved in an application. The system that provides the standard time clock should be the MIS host machine that controls the switch unit. The host_qry program 312 carries out the task of the synchronization of the system clock according to host machine. For example, for the ACD 312, this is the MIS host 124 machine. Whenever Windows® interface 304 is started, which often is due to a machine reboot in the preferred embodiment, the host_qry program 312 gets the current system clock from MIS host 124 and sets the system clock of the main machine 102 accordingly through the login to MIS host 124 and running the system time command.

To simplify the data query process of the preferred embodiment, the host_qry program 312 performs the database verification query instead of downloading data from database 330 automatically. This is to say that if an agent extension is being defined or an extension is being scheduled for monitoring sessions, or whether a notification or a recording can be carried out based on whether the target agent is currently signed on, the presence of an agent verify DDE is verified by the host_qry program 312. The host_qry program 312, if the verify DDE is present, issues a database query to MIS host 124 to verify whether the extension has been defined. The result of the query is sent back to the client program from which the DDE was sent.

Through a user request of aq program 302, a more complicated query may be executed to check whether there are new agents defined or information changes made to existing agents at the MIS host 124 database. The host_qry program 312 submits SQL query statements to the MIS host 124 database through the link between the main machine 102 and MIS host 124. The return data will be checked against the resident database 330 and updated. The user determines when it is necessary to query MIS host 124 for the latest agent and supervisor data. Most likely this occurs after knowing what modifications were made in the MIS host 124 database. Also, a query of MIS host 124 should occur before trying to revise or update the agents or supervisors in administration option 210.

In addition, from time to time changes to the MIS host 124 database will occur that relate to the information contained within the system of the preferred embodiment. Therefore, the user may periodically query MIS host 124 database to obtain those modifications. Other memory resident programs of the preferred embodiment include dde_server program 332, de_interface program 334, and channel_proc program 308. The dde_server program 332 is started by the Windows interface 304 start-up function. The dde_server program 332 behaves as a server to other Windows interface 304 programs for database 330 accessing. It communicates with db_interface program 334 for passing data items back from and forth to database 330. A consideration of the preferred embodiment is that dde_server program 332 may be expanded to the single dde_server that permits all DDE messages to be handled. This makes user interface and call processing programs become more discrete. This consideration also enhances the portability of the application of the preferred embodiment.

The db_interface program 334 is also started by the Windows® interface 304 start-up function. The db_interface program 334 handles all requests from other programs regarding any database 330 transaction. Thus, db_interface program 334 is a client as well as other programs (e.g., aq program 302 and host_qry program 312), while dde_server program 332 is the server with respect to their database accessing DDE links. A principal function that the preferred embodiment provides is to automatically record customer service representative dialogues with customers according to the programmed monitoring session schedule. Therefore, it is important that a single control point exist where all accessing to database 330 are handled. This is done not only so that the integrity of the database can be maintained, but also to make the call processing independent of the database package. The database package of the preferred embodiment may be, for example, the MS SQL Server® when the preferred embodiment is on a network.

Another memory resident program is channel_proc program 308. The channel_proc program 308 is started by the Windows® interface 304 start-up function. Voice processing in the channel_proc program 308 is done in the asynchronous mode. A state machine approach is implemented in order to ensure that every voice processing channel may be fully controlled by channel_qry program 308. States within channel_proc program 308 are driven by events which occur in an asynchronous queuing mode of operation.

There are three major components of channel_proc program 308. They include the channel diagnosis component, a timer component and a voice processing component. The channel_proc program 308 controls the voice processing channels through a voice driver function called to perform the recording and playback sessions described below. Since this program is a Windows® interface 304 program, a Windows® dynamic link library interface is used to bridge the Windows® application of channel_proc program 308 and the voice driver 108.

Figure 8:
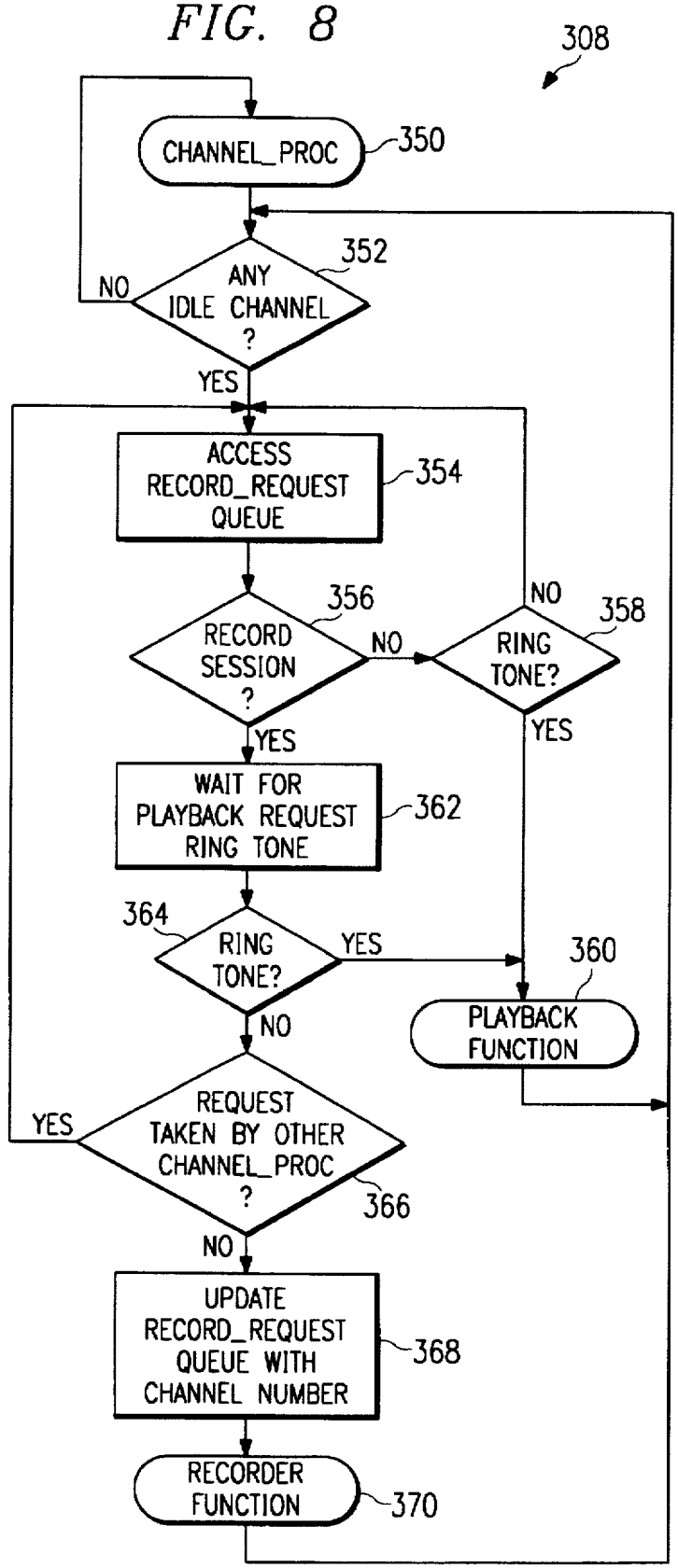
FIG. 8 is a process control flow diagram for the channel_proc program of the preferred embodiment.

FIG. 8 shows a process control flow diagram of channel_proc program 308 of the preferred embodiment. Beginning at channel_proc program access node 350, program control goes to query 352. At query 352, the presence of an idle channel is tested. If there is no idle channel then, process control goes back to node 350, and this is reported to node 350. This fact is then reported to aq program 302. On the other hand, if an idle channel exists, then flow goes to access record request query 354. From query 354, flow goes to record session query 356 to test the condition of there being a command to record a session. If no such command exists, flow goes to query 358 to test the condition of there being an inbound ring tone present indicating that a supervisor is calling into the system to listen to monitored sessions. If no ring tone exists, then control flow goes back to access record request query 354. If a ring tone exists, then process flow goes to playback function block 360.

Referring to record session query 356, if there is a record session command in the queue, then process control flow goes to block 362 where the system determines if there is a playback request ring tone. From block 362, flow goes to query 364 to test for the existence of a ring tone. If there is a ring tone, then process control flow goes to playback function block 360. Otherwise, control flow goes to query 366 to examine whether the record request has been taken by another channel_proc task. If so, then control flow goes to block 354 to reaccess the record request queue. If the request has not been taken by another channel_proc task, then control flow goes to block 368 to update the record request queue with the channel number. Next, control flow goes to block 370 to begin the recorder function. From either playback function 360 or recorder function 370, process control flow returns to query 352 so that the channel_proc program 308 continues to operate as described.

Figure 9:
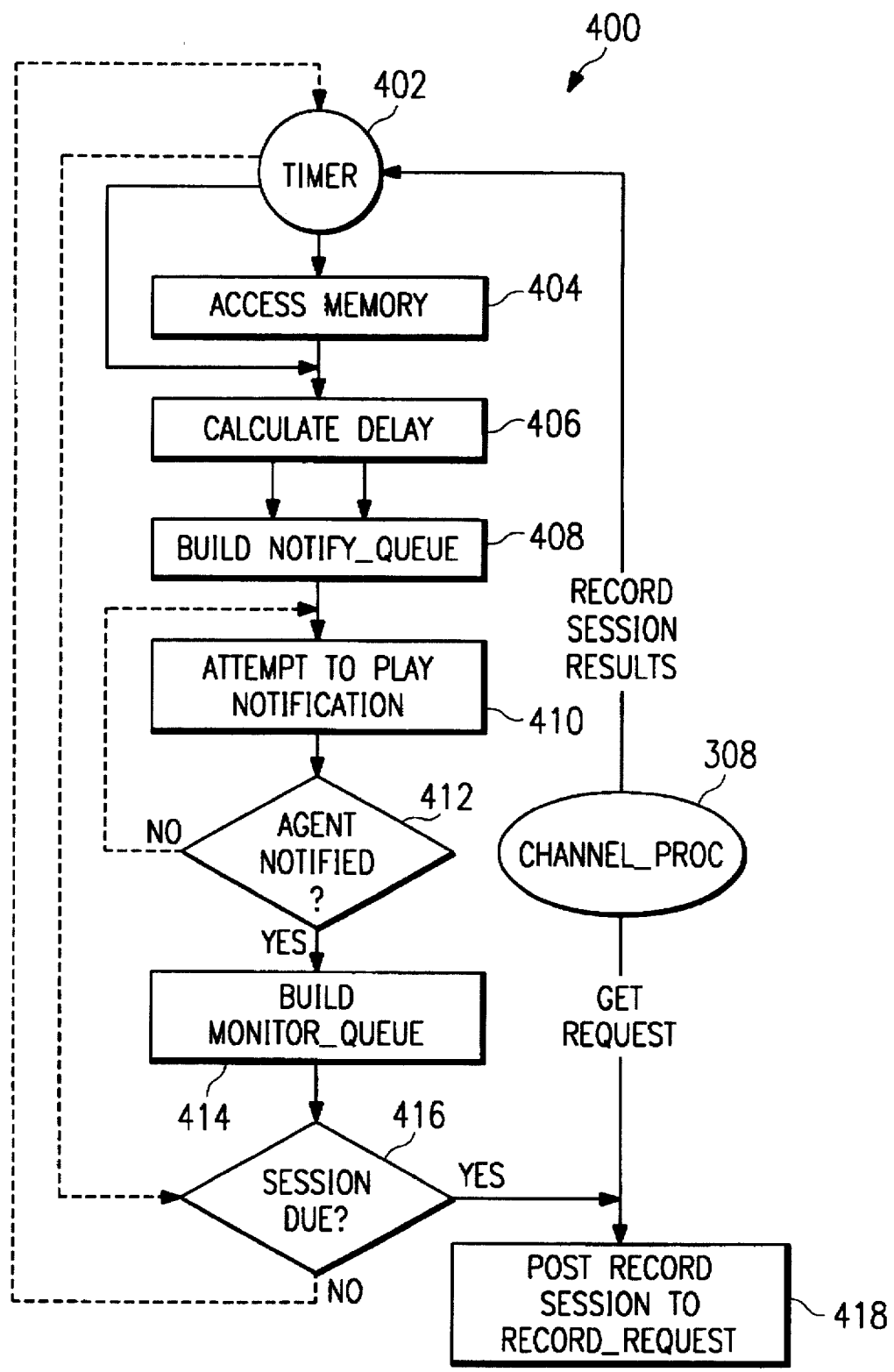
FIG. 9 shows a process control flow diagram for the timer process of the preferred embodiment.

FIG. 9 shows process control flow diagram 400 of the timer program 400 of the preferred embodiment for establishing times for recording scheduled monitoring sessions. Timer program 400 of the preferred embodiment also includes an optional "will be monitored" notification to agent extensions.

Three queries in timer function 400 include a notify queue, a monitor queue and a record request queue. These are described in more detail below following an introduction to timer program 400.

Referring to FIG. 9, the channel_proc program 308 controls access to timer node 402. At timer node 402, timer program 400 beth accesses memory as block 404 indicates and calculates a random delay period or interval to wait before beginning recording as block 406 represents. From block 406, process control flow goes to block 408 to build a notify queue, if this option is selected. From building the notify queue, process control flow goes to block 410 where an attempt may be made to play the notification to the agent. Next, at query 412 the timer function queries whether the agent has been notified. If not, process control returns to block 410 where a further attempt is made to notify the agent. If the agent has been notified, as appropriate, process control flow goes to block 414 where the step of building a monitoring queue takes place.

From block 414, process control flow goes to query 416 to examine whether a record session is due. If not, process control flow goes to timer node 402 and cycles until the time arrives for recording. If a record session is due, on the other hand, process control flow goes to block 418 to post the record session to the record request queue. The request queue is a list of monitoring sessions waiting for completion. These are sessions to be started and queued for current recording sessions to finish, or idle channels to become available. At the end of each record session, "post record session to record request" block 418 gets a query from the channel_proc program 308 for the next scheduled record session.

Relative to the build notify queue function 408 of FIG. 9, the notify queue is created if monitoring notification is selected by the system administrator. This ensures that an agent's extension is notified prior to actual recording taking place. Upon receiving a start-up or day start from the aq program 302, timer program 400 (through channel_proc program 308) sends a db_load DDE to db_interface program 334 to acquire information about extensions, periods, and monitoring sessions for the rest of the day, to the extent that they are stored in database 330. All extensions that are to be monitored for the day will be registered in the notify-queue function associated with block 408.

For every extension on the queue, timer program 400 attempts to play the audio announcement to them prior to the beginning of the period of the first monitoring session. The notification takes place when the agent is signed on. In the preferred embodiment, an attempt will be made every so often (as defined by a system parameter) to reach the agent until the notification is delivered or until the monitoring period for that extension has expired. Once the notification is delivered, the monitoring sessions scheduled for that extension for the rest of the monitoring period will be registered on the monitor queue associated with block 414 at which time the corresponding entry of the notify queue is removed.

If no notification is required, the monitor queue for all monitoring periods of all extensions scheduled for the rest of the day is constructed. In the monitor queue of timer function 400, there is a random calculation to determine when a monitoring session is to occur. A monitoring session may be started anywhere in the time frame from the time the entry is registered on the monitor queue until the end of the monitoring period. It is possible that a period is defined to bridge across the midnight boundary. The execution time of each session on the queue is determined based on the monitoring period in which the session is defined. Therefore, a session will be performed within the time scope of the period. There is a random distribution of all monitored sessions to their corresponding time period window.

For example, the calculation that the preferred embodiment applies to yield a random distribution may be based on several factors. These factors may include, for example, the following:

(1) the number of extensions to be monitored;
(2) the maximum length of time of each monitoring session;
(3) the number of channels configured for monitoring;
(4) the duration of the monitoring periods;
(5) the time interval covered by each period; and
(6) the results of the previous attempts to monitor scheduled sessions. To determine the execution of a session, calculate delay function 406 determines a delay interval from the time the session is established to the time that it is executed. The calculation is based on the following formula:

$$\text{Delay} = (\text{a random number}) \bmod (TC - TE) \quad (1)$$

where TC is the total time that all channels can be used in the time range of the period, and TE is the total time of all required sessions in the time range of the period. The actual recording or execution time could be the current time plus delay time. Information such as which extension, when to monitor, how long the recording may be, and how many call segments the sessions may have are posted on the monitoring session node to the monitor queue link list associated with timer program 400. The sessions on the monitor queue link list are in chronological order. Therefore, the earliest session is the first node on the list, while the latest session is the last node on the list. Timer program 400 also puts a recording session on the record request queue whenever the execution of a monitoring session is due. Afterward, the corresponding entry in the monitor queue is removed.

An important consideration of the preferred embodiment is resource allocation. For example, when a supervisor is defining the monitoring schedule for extensions, the preferred embodiment performs a resource analysis to guarantee that the scheduled monitoring sessions are achievable. It is an internal function of the aq program 302 to carry out the resource analysis task.

For the resource analysis task, the following definitions are appropriate:

P: The time range of a monitor period;

Total number of extensions needed to be monitored within P;

M: The maximum length of time that a monitored session is defined for the period;

C: Total number of channels designated for recording;

TC: Total time that all Channels can be used in P;

TE: Total time of all required sessions in P.

Note that TC =C×P and TE=E×M. Consequently, TE can not be greater than TC. On the other hand, there could be time overlapping in two monitor periods. For example, if period 1 is defined, using 24-hour clock notation, as 0800 to 1130 and period 2 is defined as 0900 to 1230 such a situation could arise. That is, the time period from 0900 to 1130 is covered by both periods. The analysis must consider that resources are shared by sessions scheduled in both periods in the time interval between 0900 and 1130. An even more complex case may result if a third period, say, period 3 is defined as ranging from 0800 to 1300 which covers both period 1 and period 2. Therefore, periods 1 and 3 share the interval from 0800 to 0900. Periods 1, 2 and 3 share the period from 0900 to 1130. Furthermore, periods 2 and 3 share the period between 1130 and 1230 and only the period 1230 to 1300 is owned solely by period 3. The task, then, must divide the TC value by the interval shared by N, where N is the number of periods. Calculating the resources for the first period, the value of TC should be the following:

$$TC = (TC)((0800 - 0900) + 2) + (TC)((0900 - 1130) + 3)) \quad (2)$$
$$= ((C * \text{(integral shared by periods 1 and 3)}) + 2) +$$
$$((C * \text{(integral shared by periods 1, 2 and)}) + 3))$$

Then the system compares the values TE and TC. If the value of TE is close to the value of TC, say 80%, chances are that the scheduled monitoring sessions will not all be accomplished. This percentage value can be one of the system parameters, since the channels can be used for recording as well as playback in a given period and the time occupied by playback sessions can be a big factor in how close the TE and TC values can be. Users will be warned for the possibility of not being able to accomplish the scheduled sessions if the TE value is not acceptable.

The other resource analysis is about the available disk space required to store recorded sessions. This is described in connection with the discussion of the recorder function appearing in relation to FIG. 10. These types of preventative actions minimize problems due to lack of resources while actual sessions progress.

An important aspect of the preferred embodiment is the voice processing function. This function contains the recording function and playback functions described in FIGS. 10 and 11 below, respectively. The recording and playback functions perform call processing functions using the channels 110 and voice driver in conjunction with a dynamic link library interface that relate to reference numeral 108 of FIG. 4.

Figure 10:
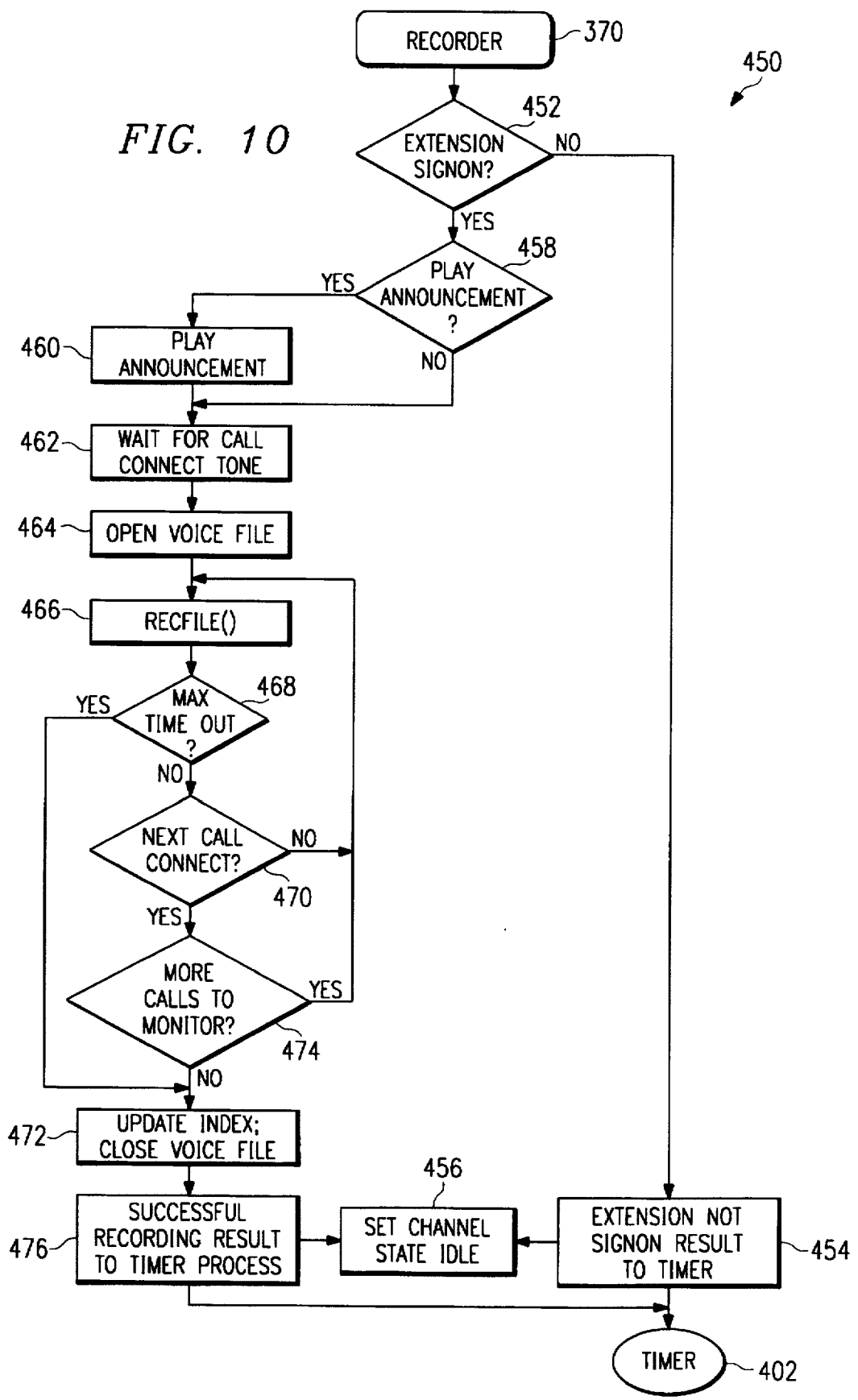
FIG. 10 shows the function control flow diagram for the recording function of the preferred embodiment.

FIG. 10, therefore, shows a function control flow diagram 450 for recorder function 370. Beginning at recording function block 370, the system of the preferred embodiment accesses the channel_proc program 308 as described in FIG. 8. Function control flow goes to query 452 to determine whether an extension is signed on. If the extension is not signed on, then function control goes to block 454 to generate a message that indicates the result that the extension is not signed on. This result goes to time function node 402 and to block 456 to set the channel state to idle. On the other hand, if the extension is signed on, then at query 458 a test is made to determine whether an announcement is to be played that notifies the agent of the impending recording session. If so, then function control flow passes to block 460 where an announcement is played to the agent's extension. If not, then function control flow goes to block 462 at which point the system waits for a call connect indication.

Once a call connection occurs, the system of the preferred embodiment opens a voice file at block 464 and begins recording at block 466. Recording continues while query 468 verifies that a maximum time limit has not been reached and query 470 determines if the next call has been connected to the agent. If the maximum time out has been reached, then query 468 directs function control flow to block 472 where the steps of updating the index and closing the voice file take place. Additionally, at query 470 when the next call is connected to the agent, function control flow then goes to query 474 to determine whether there are more calls to monitor.

If there are more calls to monitor, then function control flow returns to record step 466. On the other hand, if there are no more calls to monitor, function control flow proceeds from query 474 to block 472 at which point the index is updated and the voice file is closed. From block 472, function control flow goes to block 476 to generate a successful recording result message to timer function 402. This completes a general description of the operation of recorder function control flow diagram 450.

As described, the recorder function performs the recording of a monitoring session. When a recording session starts, a voice file with a unique name will be opened. The voice file contains, in the preferred embodiment, a leading section reserved as a file header in which the information regarding the rest of the file is stored as digitized voice data. The purpose of the file header is to register when there is more than one segment of the voice data in the voice file. These segments may have different characteristics such as annotation from a supervisor added after a playback session in the voice file. Therefore, a voice file may contain a sequence of blocks that the file header defines.

During a playback session, a supervisor may annotate comments with respect to any part of the recorded conversation from time to time and be able to listen to the session with the annotations appearing after each segment. These annotations may be played back when the voice file is played again. In the preferred embodiment, the voice processing function provides a silence compression mode to eliminate silence intervals during recording. The monitoring length defined in the period is a wall clock time. A voice file may actually contain only a fraction of the expected time length due to silence compression. Even if the recording session takes up to the maximum specified time length. This can be considered as a bonus for disk resource, as well as the amount of supervisor time needed to perform the monitoring reviews, but should not be considered as a factor in the resource analysis.

The following considerations are important when determining the necessary resources to accommodate the recording files that the preferred embodiment generates. Since the data will be optimally recorded at a rate of 24,000 bits per second, the maximum length of voice data will be (24,000+[ ])×(the time in seconds that is specified in the monitoring period). The 24,000 bits per second comes from the 4-bit adaptive differential pulse code modulation (ADPCM) encoding and a 6,000 Hz sampling rate. The following calculation may give an idea about how many minutes of voice data may be digitized with a 1 MB disk storage capacity:

$$(1024 \text{ bits} \times 1024 \text{ bits}) \div \quad (3)$$
$$((24,000 \text{ bits/second} \div \text{bits}) \times 60 \text{ seconds/minute}) = 5.8 \text{ minutes}$$

With 1.2 G byte SCSI disk drive the capacity of storing voice file data is about 100 hours.

Digitized voice files take significant amounts of disk space. In order to accommodate all required monitoring sessions and adding annotations, disk space management is an important aspect of the preferred embodiment. Available disk space checking is done at the beginning of a day, whenever the monitoring schedule of the day is revised, when a monitoring session is about to start, when a playback session is requested, when an annotation starts, and when a user is recording or re-recording the voice files used for playback prompts.

The minimum disk space required is calculated by (3,000) ×(the monitoring time in seconds) of all unfinished sessions for all extensions that may be monitored during the day, plus the space reserved by a system parameter of how many minutes of annotation for a day is allowed and all utility voice files used in the voice prompts during the playback sessions. There must be a system reserved disk space buffer so that, if the remaining disk space falls below this limit, all subsequent voice file generations will not take place until sufficient disk space is available, that is, after some voice files are deleted through the voice file maintenance function of the aq program 302.

Optionally, the actual recording does not start until a specific tone (e.g., a call that has just been connected to the monitored extension) is arrived from ACD 12 or a predefined period of silence occurs within the recording session. In this operational mode, every call recorded will be a complete call. If more than one call is scheduled to be monitored in a session, the recording will continue until the next call connect tone or silence interval and after the last call is recorded or the maximum time length is reached. However, in the preferred embodiment a call will not be truncated even if the maximum time length has been reached.

Figure 11:
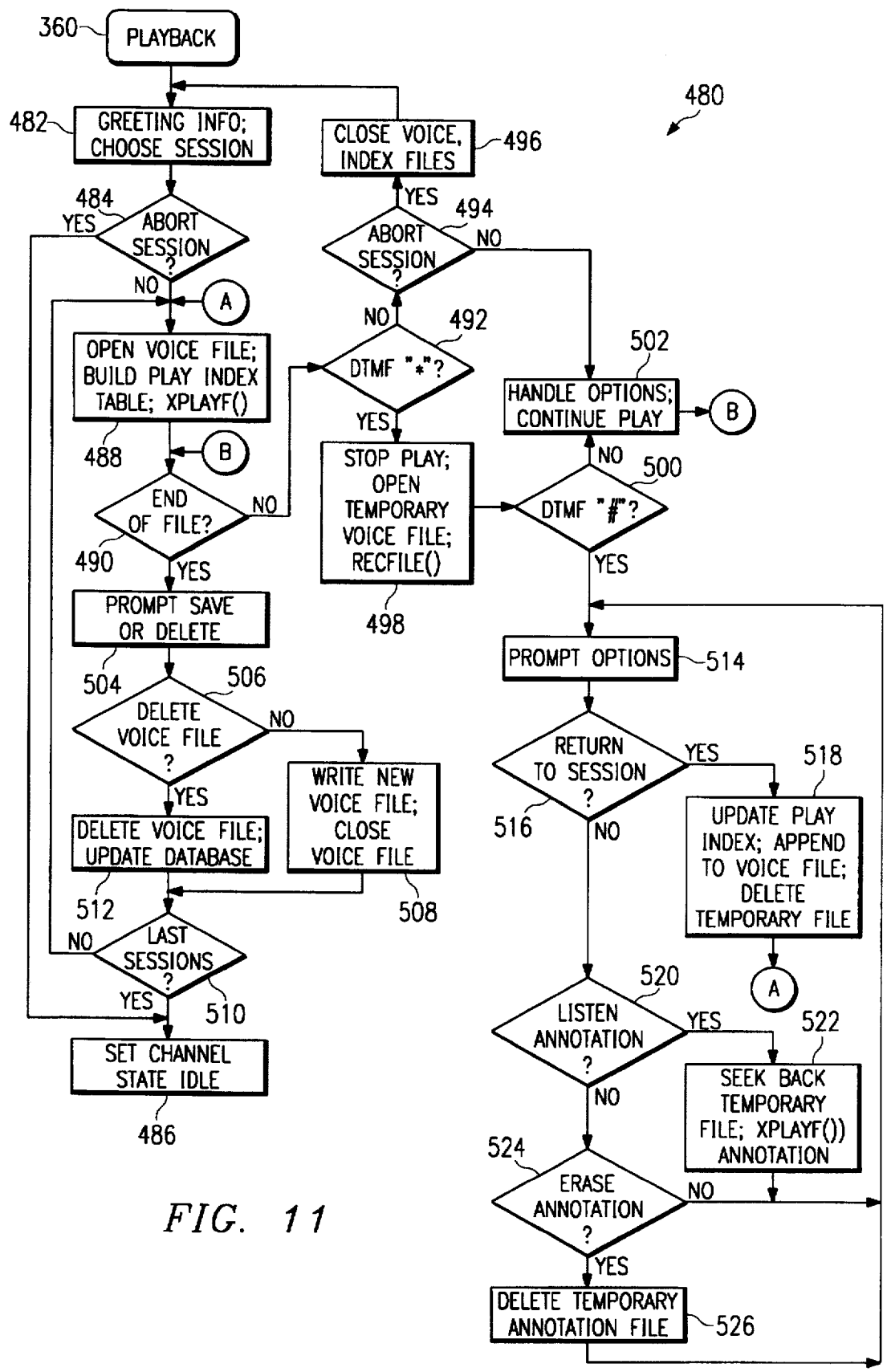
FIG. 11 shows the function control flow diagram for the playback function of the preferred embodiment.

After recording the monitoring sessions, there is the need to play them back in a variety of different modes. For this purpose, FIG. 11 shows the function control flow diagram 480 for the playback function of the preferred embodiment. Beginning at block 360, playback can be accessed through the channel_proc program 308 as described above in connection with the channel_proc process control flow diagram for channel_proc program 308. Returning to FIG. 11, from block 360 function control proceeds to block 482 where greeting information is given and session parameters presented to the user. Then, function control goes to query 484 for the query of whether an abort session command exists.

If an abort session command exists, then function control goes to block 486 where the channel state is set to "idle". If there is no abort session command, function control goes to block 488 at which step a voice file is opened, and recorded sessions begin to be played back to the user. From block 488, function control goes to query 490 to test whether the control flow is at the end of the voice file. If not, then, function control flow goes to query 492 to test whether the dual tone modulating frequency (DTMF) that corresponds to the telephone keypad digit "*" has been received.

In the preferred embodiment, the "*" is used to signal the user's desire to pause and record an annotation. If there is no DTMF "*" signal, function control proceeds to query 494 where the abort session test occurs. If an abort session signal is present, then function control flow goes to block 496 to close the voice and index files and return to block 482 where the greeting information and session options are presented to the operator. If at DTMF "*" query 492 the DTMF "*" input is present, function control goes to block 498 where play is stopped and a temporary voice file is opened for the purpose of recording an annotation. Annotation recording will continue until at query 500 the presence of a DTMF "#" signal is tested. If the DTMF "#" signal is not present, then function control proceeds to block 502 where options are handled and play continues. This is the same step that abort session query 494 directs flow control to in the event there is not an abort session signal in the queue.

Returning to query 490 of whether the end of the file exists, if an end-of-file signal is present, function control goes to block 504 at which point the user is prompted for a response of whether the user desires to save or delete the recording. Function control then proceeds to query 506 at which a test occurs of whether a delete voice file command is present. If there is no delete voice file command, then function control proceeds to block 508 where the existing voice file is closed. Function control proceeds to query 510 to test whether the user is listening to the last set of monitoring sessions. On the other hand, if at query 506 a delete voice file command is present, then function control goes to block 512 where the voice file is deleted and the database is updated to reflect this deletion. Then, function control proceeds to query 510 to examine whether the user is listening to the last session. From query 510, if the operator is listening to the last session, then function control flows to set channel state idle block 486. On the other hand, if this is not the last session, then function control flows to block 488.

Returning to query 500 of whether the DTMF "#" input is present, an affirmative test directs function control to block 514 where the user is prompted to various options that the user may exercise. Then, function control proceeds to query 516 at which point a test is made of whether there exists a return-to-session command in the system queue. If there is a return-to-session command, then function control proceeds to block 518 at which point the play index is updated, the annotation is inserted into the voice file, and the temporary file that was opened at block 498 is deleted. Then, function control proceeds back to block 488 where further playback can proceed. If there is not a return-to-session command upon query 516 testing for the existence of such, then function control proceeds to query 520 to determine whether there is a listen annotation in the queue.

If there is a listen annotation, then function control proceeds to block 522 to seek another temporary file and record an annotation. Then, function control returns to block 514 to provide to the user the various appropriate prompt options. At query 520 if no listen annotation exists, then function control proceeds to query 524 to test whether there is an erase annotation. If there is no erase annotation, then function control returns to prompt options block 514. On the other hand, if there is an erase annotation, then function control goes to block 526 for the purpose of deleting the temporary annotation file. Then, function control returns to prompt options 514.

Having described the playback function through function control flow chart 480, more detail of the various functions that occur in playback function are provided herein. For example, the following prompts apply to all sessions, or sessions in a subgroup, or sessions of an extension.

"There are XX sessions that have not previously been played."

"These sessions total YY minutes."

"Press 1 to specify a specific session."

"Press 2 to begin playing these sessions in time sequence order."

This is not limited by any not previously played sessions. If a "1" is entered, the system of the preferred embodiment asks for the session identification number using the following command:

"Enter the session ID desired."

The session identifier or ID is the digits part of the voice file name of the session in the preferred embodiment. The supervisor can obtain information about all monitored sessions from the session report via either the screen or a printout, or both. Prior to each playback session, information about the session is announced to the reviewer in the following way:

"The following session recorded at MMDDHHMM for John Smith (name) at extension ZZZZ is YY minutes long."

During a playback session, the following Table I lists DTMF digits that may be entered for various actions:

TABLE 1

| DTMF Digit | Action |
| --- | --- |
| "0" | Abort Session; |
| "1" | Increase the play speed; |
| "2" | Skip ten seconds; |
| "3" | Increase the play volume; |
| "5" | Pause and resume toggles; |
| "7" | Decrease the play speed; |
| "8" | Back-up ten seconds; |
| "9" | Decrease the play volume; |
| "*" | Pause and record an annotation; |
| "#" | Stop the annotation |

After the "#" is entered during an annotation session, the system of the preferred embodiment prompts the supervisor in the following way:

"To return to the session, press 4."

"To listen to the annotation just recorded, press 5."

"To erase the annotation just recorded, press 6."

At the end of each session played, the supervisor may delete or save the played session as block 504 indicates. Therefore, the preferred embodiment plays to the supervisor or other user the following prompt:

"To delete this session, enter 88."

"To save this session, enter 11."

Upon entering a playback session through block 482 of FIG. 11, the voice file of the session is opened at block 488 and the playback information is constructed from the header of the voice file.

One user input is the DTMF "*", that pauses the playback and records the annotation from the user. When the DTMF "*," is entered, to record an annotation is similar to the recording process in the recorder process that FIG. 10 describes. However, in the annotation mode a temporary file describing the process includes an annotation voice file name. Once the annotation is recorded, the associated file header is updated. The annotation voice file is concatenated to the original voice file when the playback session resumes if the annotation has not been selected for erasure. Information about blocks are updated in the file header when the voice file is written to disk. To alter the play speed and play volume, there are ways in the preferred embodiment to take advantage of the voice functions to either set the voice tables so that speed or volume adjustment is altered according to the definition.

In summary, the present invention provides a method and system for monitoring the performance of a service representative such as a call center agent in serving telephone calls. The method and system include the steps of and necessary elements for permitting a call center supervisor or other operator to automatically determine an interval within which to monitor the performance of service representatives in responding to received telephone calls. The supervisor also may automatically determine the number of calls or length of time to monitor within the interval. With the interval, number of calls, and/or length of time pre-specified, the invention automatically and randomly determines the time for monitoring and records the proper number of calls or length of time. The call center supervisor may subsequently review the recorded calls. The method and system further include the steps of, and instructions for, playing back the recorded monitoring sessions. As a result, the present embodiment provides to a call center supervisor a consistent and equitable method of monitoring the performance of call center agents.

Although the invention has been described with reference to the above-specified embodiments, this description is not meant to be construed in a limiting sense. Various modifications of the disclosed embodiment, as well as alternative embodiments of the invention, will become apparent to persons skilled in the art upon reference to the above description. It is, therefore, contemplated that the appended claims will cover such modifications that fall within the true scope of the invention.

What is claimed is:

1. A method for monitoring a plurality of service representatives in handling customer calls, the method comprising the steps of:

determining a time interval within which to monitor customer calls between the service representatives and customers;

determining for each service representative a maximum number of customer calls to be monitored within the time interval; and automatically recording a number of customer calls less than or equal to the maximum number of customer calls for each service representative during the time interval in a memory in digital format.

2. The method of claim 1 further comprising the step of randomly determining for each service representative to be monitored a time period within the time interval to individually monitor each service representative's customer calls.

3. The method of claim 2 wherein said time period further comprises a plurality of predetermined time periods.

4. The method of claim 1 further comprising the step of playing back said recorded customer calls at variable playback speeds.

5. The method of claim 1 further comprising the step of annotating said recorded customer calls by retrieving said recorded customer calls from the memory and adding additional data to said recorded customer calls.

6. The method of claim 1 further comprising the step of automatically generating periodic reports of a plurality of said recorded customer calls.

7. A system for monitoring a plurality of service representatives in servicing customer calls, the system comprising:

a processor for executing a plurality of computer implemented instructions comprising:

instructions for determining a time interval within which to monitor customer calls between the service representatives and customers; and instructions for determining for each representative a maximum number of customer calls to be monitored within the time interval; and a recorder for automatically recording a number of customer calls less than or equal to the maximum number of customer calls for each representative during the time interval in a memory in digital format.

8. The system of claim 7 further comprising instructions for randomly determining for each service representative to be monitored a time period within the time interval to individually monitor each service representative's customer calls.

9. The system of claim 8 wherein said time period further comprises a plurality of predetermined time periods.

10. The system of claim 7 further comprising instructions that permit a user to retrieve said recorded customer calls from the memory and for adding additional data to said recorded customer calls.

11. The system of claim 7 further comprising instructions that permit said recorded customer calls to be played back.

12. The system of claim 7 further comprising instructions that permit said recorded customer cells to be played back at one of a plurality of different speeds.

13. The system of claim 7 further comprising instructions for automatically generating periodic reports on a plurality of said recorded customer calls.

14. A system for monitoring a plurality of service representatives in servicing customer calls, the system comprising:
   a supervisor workstation for executing supervisor instructions comprising:
      instructions for determining a time interval within which to monitor customer calls between the service representatives and customers; and
      instructions for determining a maximum number of customer calls to be monitored for each service representative;
   a service monitoring control processor for executing service monitoring control instructions, the service monitoring control instructions comprising instructions for scheduling the recording by a recorder of a number of customer calls less than or equal to the maximum number of customer calls for each representative during the time interval; and
   the recorder for recording the customer calls for each representative in a memory in digital format.

15. The system of claim 14 wherein said service monitoring control instructions further comprise instructions for notifying the service representative that said recording will occur.

16. The system of claim 14 wherein said service monitoring control instructions further comprise instructions for randomly determining for each service representative to be monitored a time period within the time interval to individually monitor each service representative's customer calls.

17. The system of claim 16 wherein said time period further comprises a plurality of predetermined time periods.

18. The system of claim 14 wherein said service monitoring control instructions further comprise instructions that permit a user to retrieve said recorded customer calls from said memory and to add additional data to said recorded customer calls.

19. The system of claim 14 wherein said service monitoring control instructions further comprise instructions that permit said recorded customer calls to be played back.

20. The system of claim 14 wherein said service monitoring control instructions further comprise instructions for reporting said recorded customer calls to said supervisor workstation.

21. A method for monitoring a plurality of service representatives in servicing customer calls, the method comprising the steps of:
   determining a maximum number of customer calls for each service representative to be recorded within a predetermined time interval;
   randomly determining a time period within the time interval for recording each of the service representatives for a number of customer calls less than or equal to said maximum number of customer calls; and
   automatically recording said customer calls between the service representatives and customers during said time period.

22. The method of claim 21 further comprising the step of automatically generating periodic reports of a plurality of said recorded customer calls.

23. The method of claim 21 further comprising the step of playing back said recorded customer calls at variable playback speeds.

24. The method of claim 21 further comprising the step of annotating said recorded customer calls by retrieving said recorded customer calls from the memory and adding additional data to said recorded customer calls.

25. The method of claim 21 wherein said time period further comprises a plurality of predetermined time periods.

26. A method for monitoring a plurality of service representatives in handling customer calls, the method comprising:
   determining for each service representative a time interval in which to monitor customer calls between the service representative and customers;
   determining for each service representative a maximum number of customer calls to monitor;
   opening a voice file associated with the service representative;
   detecting the connection of a customer call to the service representative;
   recording the customer call in the voice file;
   repeating the steps of detecting and recording for each customer call to monitor; and
   closing the voice file if the maximum number of customer calls have been recorded.

27. The method of claim 26, further comprising:
   determining a maximum monitoring length; and
   closing the voice file if the maximum monitoring length has been reached.

28. The method of claim 26, further comprising:
   determining a maximum monitoring length; and
   closing the voice file if the maximum monitoring length has been reached, wherein the maximum monitoring length is reached before the maximum number of customer calls have been recorded.

29. The method of claim 26, further comprising:
   determining a maximum monitoring length;
   determining that the maximum monitoring length has been reached during the recording of a particular customer call; and
   closing the voice file upon recording the particular customer call.

30. The method of claim 26, further comprising:
   determining a maximum monitoring length;
   determining that the maximum monitoring length has been reached during the recording of a particular customer call and before the maximum number of customer calls have been recorded; and closing the voice file upon recording the particular customer call.

31. The method of claim 26, wherein the step of determining a time interval comprises randomly determining a time period within the time interval to monitor customer calls.

32. The method of claim 26, wherein the step of determining a time interval comprises randomly determining a plurality of time periods within the time interval to monitor customer calls.

33. The method of claim 26, further comprising accessing the voice file and playing back the recorded customer calls at variable playback speeds.

34. The method of claim 26, further comprising:

retrieving a selected recorded customer call from the voice file; and adding additional data to the selected recorded customer call.

35. The method of claim 26, further comprising generating periodic reports of a plurality of the recorded customer calls.

36. The method of claim 26, wherein the voice file comprises a memory in digital format.

* * * * *